United States Patent [19]
Burkit et al.

[11] Patent Number: 5,333,916
[45] Date of Patent: Aug. 2, 1994

[54] EXTERNAL PIPE COUPLING SYSTEM WITH INFLATABLE GASKET

[76] Inventors: William A. Burkit, 613 Diehl Ave., Bethlehem, Pa. 18015; John W. Burkit, P.O. Box 19, Kempton, Pa. 19529

[21] Appl. No.: 39,634
[22] Filed: Mar. 30, 1993
[51] Int. Cl.$^5$ .............................. F16L 17/00
[52] U.S. Cl. .......................... 285/97; 285/112; 138/99
[58] Field of Search .................. 285/97, 112; 138/99

[56] References Cited

U.S. PATENT DOCUMENTS

| | | | |
|---|---|---|---|
| 2,036,320 | 4/1936 | Connelly et al. | 285/112 X |
| 2,473,102 | 6/1949 | Krooss | 285/112 |
| 3,023,995 | 3/1962 | Hopkins | 285/97 X |
| 3,229,446 | 7/1967 | Katis et al. | 285/112 |
| 3,420,554 | 1/1969 | Straub | 285/97 |
| 3,480,043 | 11/1969 | Proudfoot et al. | 285/97 X |
| 3,695,637 | 10/1972 | Satterthwaite | 285/97 |
| 4,373,377 | 2/1983 | Smith et al. | 285/97 X |
| 4,448,218 | 5/1984 | Vetter | 138/99 |
| 4,676,531 | 6/1987 | Martin | 285/97 X |
| 4,741,561 | 5/1988 | Morita et al. | 285/93 |
| 4,786,087 | 11/1988 | Thewlis et al. | 285/97 |
| 4,802,509 | 2/1989 | Brandolf | 138/110 |
| 5,086,809 | 2/1992 | Bridges | 138/99 |
| 5,160,175 | 11/1992 | Yang | 285/104 |

FOREIGN PATENT DOCUMENTS 1491334  8/1967  France ........................ 285/97

Primary Examiner—Dave W. Arola
Attorney, Agent, or Firm—William B. Noll

[57] ABSTRACT

This invention preferably relates to an externally applied coupling system providing thrust restraint for a pair of axially aligned tubular members. The coupling system comprises a hydraulically/pneumatically inflatable, elastomeric sealing gasket adapted to encircle and apply pressure to the wall of the tubular members, where the sealing gasket includes means for inflating same, and a support member. The support member is defined by a pair of curved legs joined by a web portion along one end of each curved leg to reveal a U-shaped channel member. The free end of each curved leg cooperates with one of the tubular members to provide thrust restraint thereto, and further, the support member is adapted to overlie the sealing gasket so as to confine the compressive pressure from the sealing gasket against predefined annular portions of the tubular members.

15 Claims, 4 Drawing Sheets

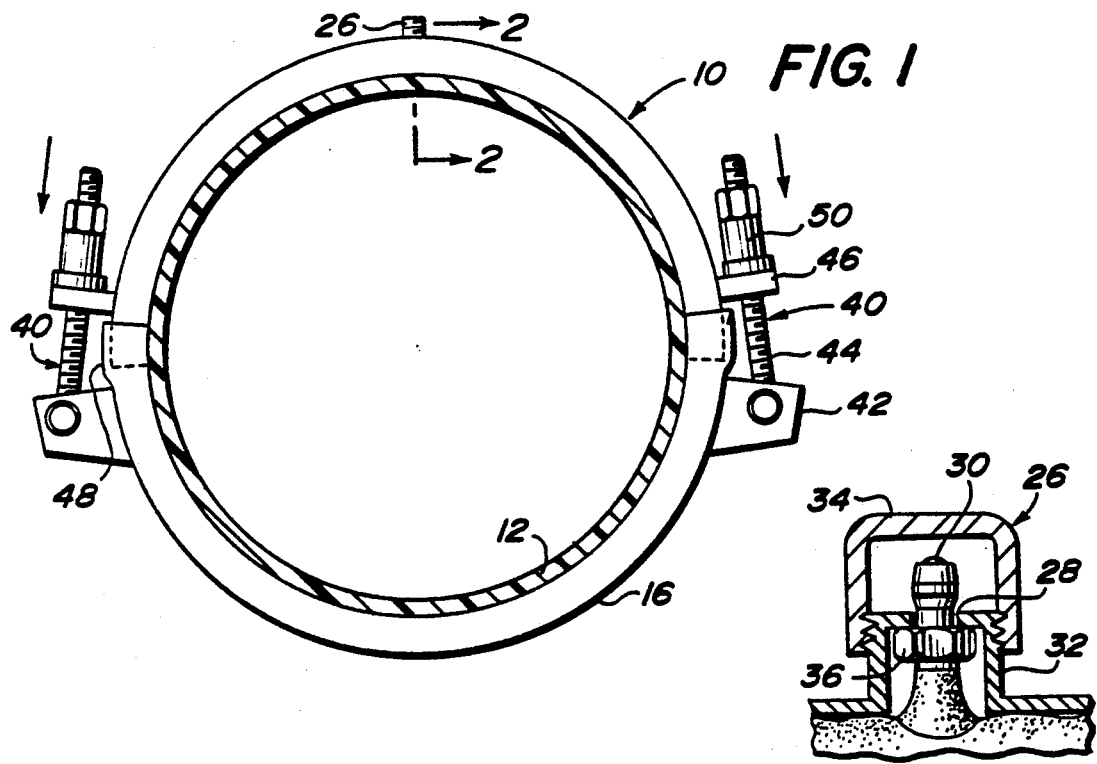
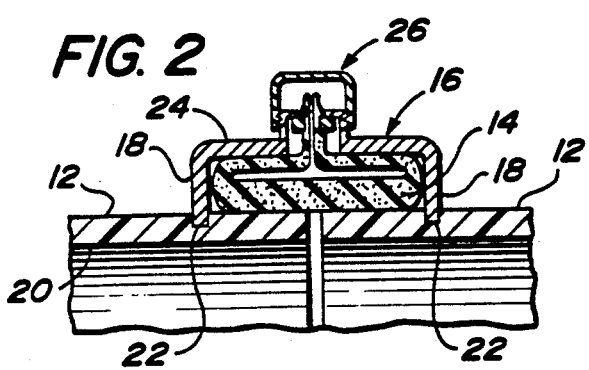
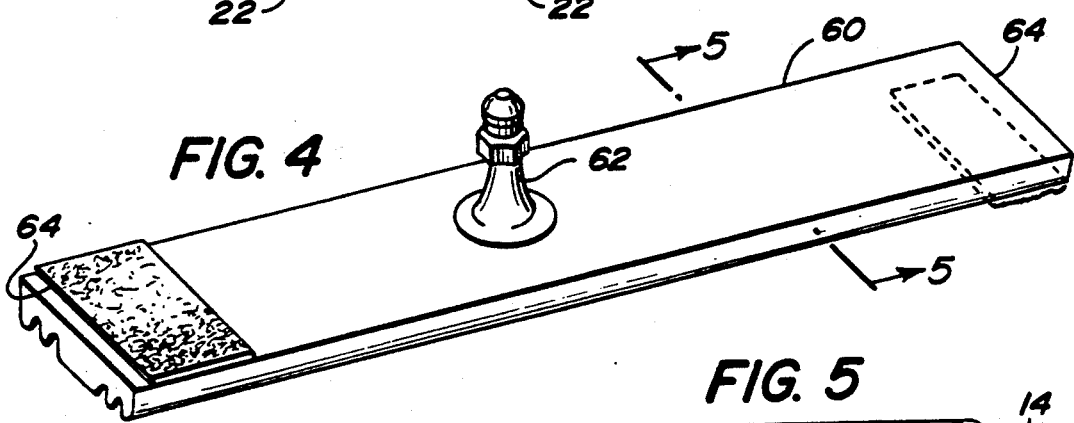

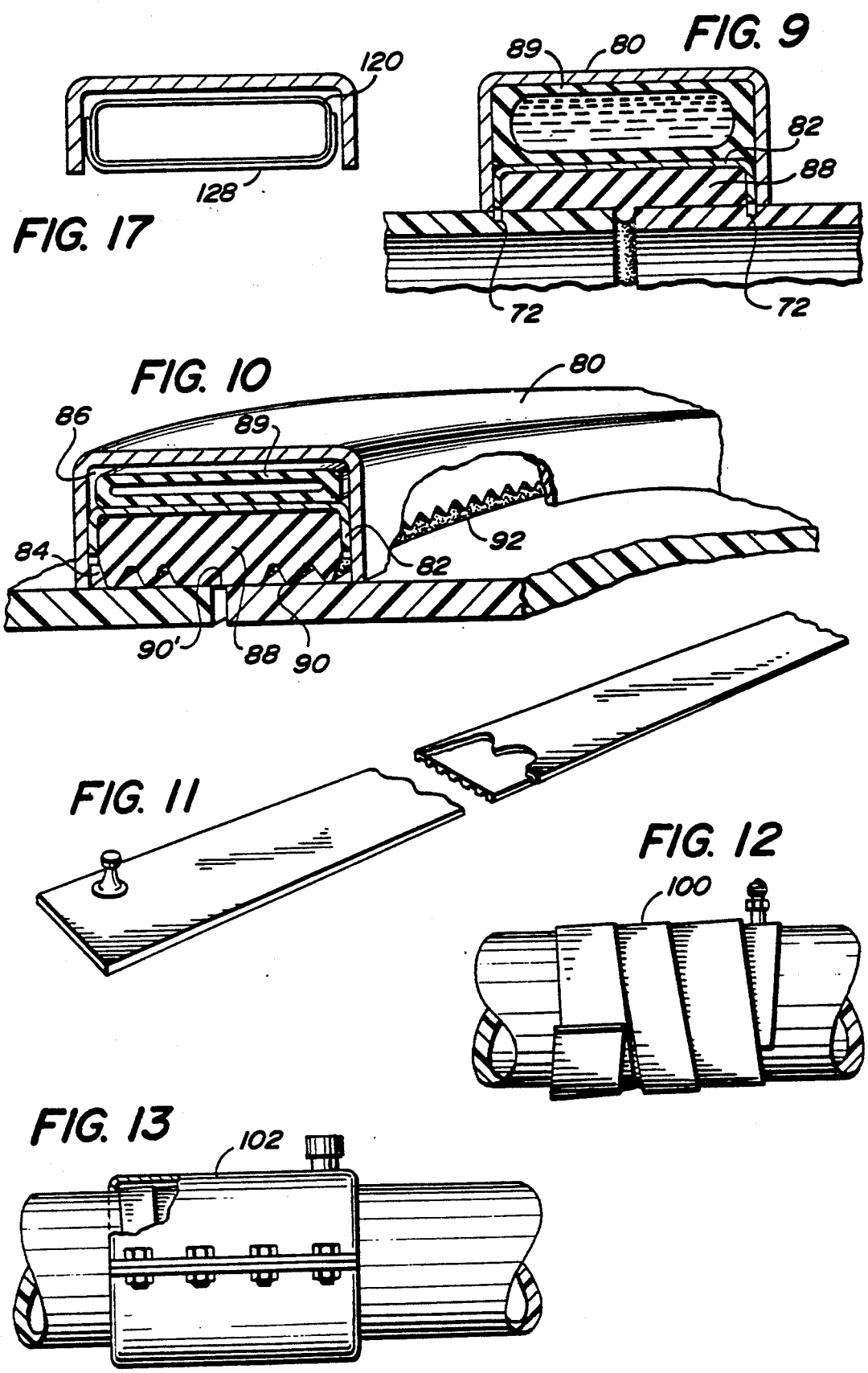

FIG. 14
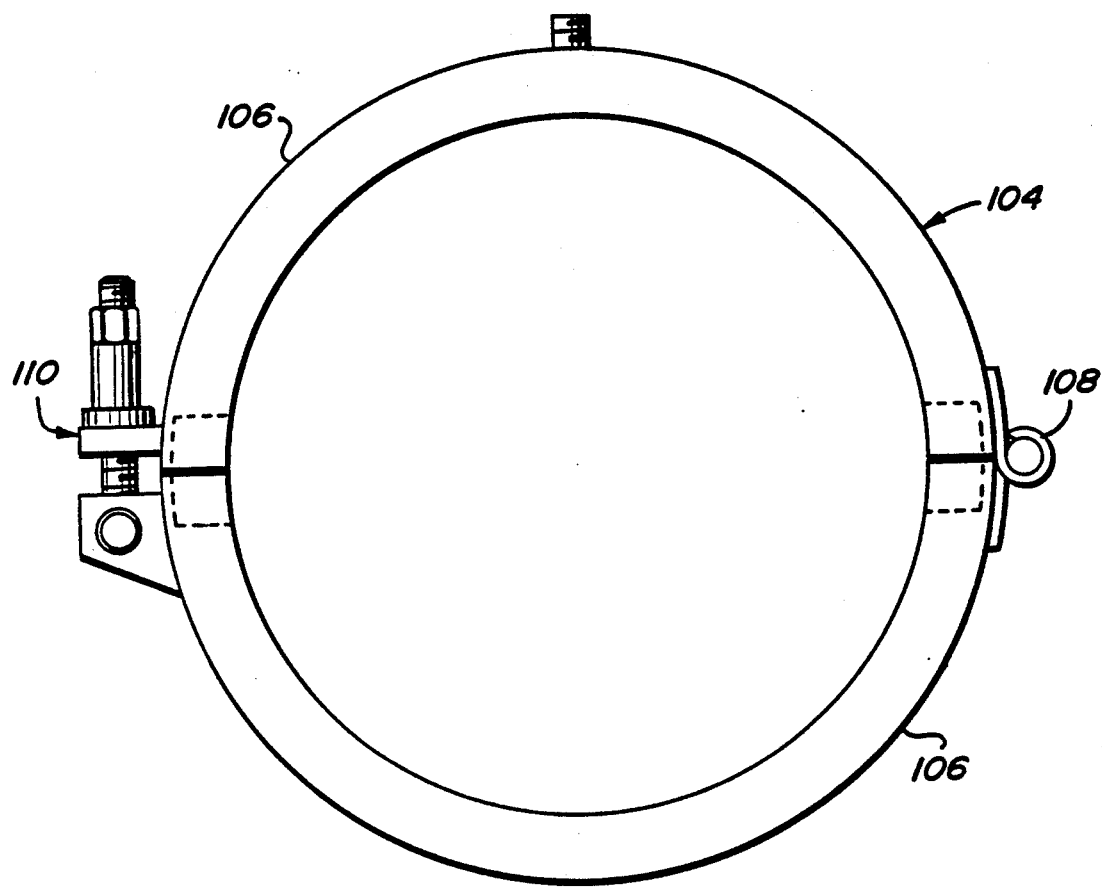
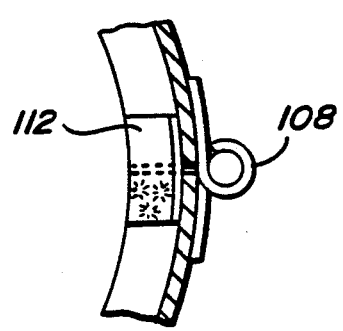
FIG. 15
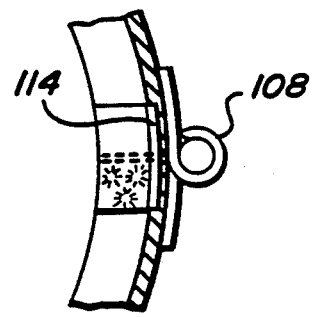
FIG. 16

EXTERNAL PIPE COUPLING SYSTEM WITH INFLATABLE GASKET

BACKGROUND OF THE INVENTION

This invention is directed to an externally applied coupling and sealing system that provides thrust restraint to a pair of aligned tubular members. Preferably, the system hereof utilizes an inflatable, elastomeric sealing gasket which encircles and applies pressure to the walls of the tubular members forming the joint therebetween. An alternate embodiment uses an inflated or pressurized thin metal chamber for low pressure transmission systems for exhaust or other special high temperature applications.

There have been prior art attempts to incorporate inflatable sealing members into a system that offers a temporary means to effect sealing of a tubular member. The U.S. Pat. Nos. 4,786,087, to Thewlis et al., and 4,741,561, Morita et al., represent two such attempts.

Thewlis et al. teach a quick disconnect coupling system for transmitting chemicals, for example, from a storage tank to a reactor tank or vessel. Briefly, one end of the coupling system is connected to a storage tank containing the chemicals. The other end of the coupling system is a rigid pipe connected to one end of a hose for transferring the chemicals of the storage tank to a reactor tank. The outlet pipe has a concentrically mounted rigid tube secured thereto via an annular flange which cooperates to receive the rigid pipe. An inflatable tube or mandrel is located between the rigid pipe and the rigid tube which is connected to the outlet pipe such that on inflation of the inflatable tube the rigid pipe is securely fastened to the outlet pipe and its concentrically mounted rigid tube to provide a sealing connection for transfer of materials from the storage tank to the reactor tank. Such a coupling system is necessarily limited to temporary and low pressure transmissions. It cannot be adapted to high pressure transmissions as it does not afford significant thrust restraint. For such system, thrust restraint is solely dependent on friction between the outer pipe surface or wall and the inflatable tube.

Morita et al. teach a seal for a connection joint that has particular utility for piping in a nuclear power plant. Specifically, the joint is a bell spigot joint composed of a male pipe and a female pipe end. The male and female pipe ends are removably engaged with gaskets. The gaskets are inflatable and arranged in a plurality of stages in the axial direction to inflatable seal a clearance between the pipe ends, and the joint has a clamp device for clamping the two pipe ends so that the pipe ends can be engaged and disengaged. The gaskets are positioned in machined annular grooves integral with the inner wall of the female pipe end.

U.S. Pat. No. 4,448,218 to Vetter teaches an apparatus for sealing leaks in conduits, such as pipes. The apparatus thereof includes a rectangularly inflatable pad comprising top and bottom layers with top layer constructed of inelastic material and the bottom layer of very elastic material connected together. The pad has mutually opposite side strips and mutually opposing frontal and rear strips. Straps are provided for attachment to the side strips for securing the pad about a leak in a pipe, or the like. The pad is provided with a valve and member for inflating the pad.

The present invention avoids many of the shortcomings of the prior art by providing a reusable, on-site applied system for sealing leaks and joints in a high pressure, or other special application in a transmission line. The unique features hereof will become apparent in the specification which follows.

SUMMARY OF THE INVENTION

The preferred invention is directed to an externally applied coupling system providing thrust restraint for a pair of axially aligned tubular members. The coupling system comprises a hydraulically or pneumatically inflatable, sealing gasket, such as an elastomeric bladder, either as a continuous member in the case of new pipe installations, or a discrete member, in the case of damage repair situations to be wrapped around the tubular members to encircle same and apply pressure to the wall of the tubular members, where the sealing gasket includes means for inflating same. Such system further includes a support member, defined by a pair of curved legs to reveal a U-shaped channel member. The free end of each curved leg cooperates with the outer wall of the tubular members to provide thrust restraint thereto. By this arrangement, the support member is adapted to overlie the sealing gasket so as to confine the compressive pressure from the sealing gasket against predefined annular portions of said tubular members. Alternatively, for some special applications, such as high temperature exhaust gases or chemical media, an expandable pressurized thin metal chamber may be used to replace the elastomeric gasket.

BRIEF DESCRIPTION OF DRAWINGS

FIG. 1 is an end view of the external coupling system according to the present invention.

FIG. 2 is an enlarged sectional view taken along line 2—2 of FIG. 1.

FIG. 3 is a further enlarged sectional view showing the valve stem or inflatable means illustrated in FIG. 2.

FIG. 4 is a perspective view of a discrete elastomeric sealing gasket for use in the system of this invention.

FIG. 5 is a sectional view taken along line 5—5 of FIG. 4.

FIG. 9 is an enlarged sectional view taken along line 9—9 of FIG. 8 showing the support member, inflatable bladder, gripping member, and sealing gasket of this invention, while further showing an alternate contact configuration for the continuous, solid sealing gasket.

FIG. 10 is a partial perspective view, with parts removed, illustrating the external coupling for the embodiment of FIGS. 8 and 9.

FIG. 11 is a perspective view, with parts removed, of an inflatable, discrete sealing gasket, having an extended length, for a multiple wrap around sealing member according to this invention.

FIG. 12 is a plan view showing the application of the gasket of FIG. 11 to a tubular member, or pair of aligned tubular members.

FIG. 13 is a plan view, with parts removed, showing an external coupling member applied about the gasket of FIG. 12.

FIG. 14 is an end view of a hinged support member as may be used in the system of this invention.

FIG. 15 is a partial sectional view of the hinged support member shown in FIG. 14.

FIG. 16 is a partial sectional view, similar to FIG. 15, showing a modification thereto.

FIGS. 17-20 are partial sectional views showing several profiles for sheet metal, inflatable chambers for use in special applications, a further embodiment of this invention.

DETAILED DESCRIPTION OF PREFERRED EMBODIMENTS

Figure 8:
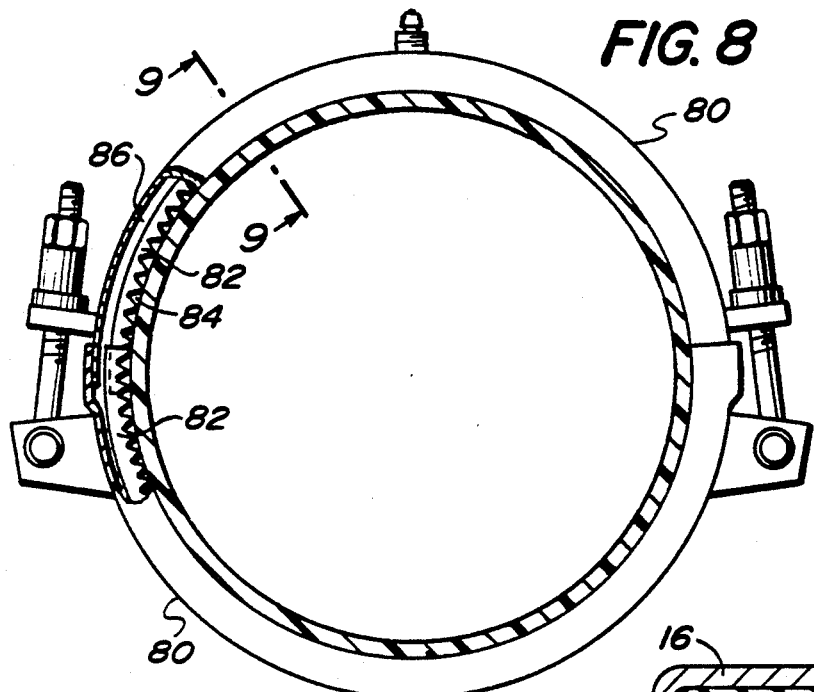
FIG. 8 is an end view, with portions removed, of a further embodiment illustrating the U-shaped, outer channel support member and an inner channel gripping member according to this invention.

Turning now to the preferred embodiment of FIGS. 1 and 2, the external coupling system 10 of this invention is adapted to provide thrust restraint to a pair of aligned tubular members, with such tubular members being shown as pipes 12 in the Figures. The preferred system hereof comprises an inflatable, elastomeric sealing gasket 14 that is contained within U-shaped, semicircular, channel members 16. As best seen in FIG. 2, the channel member 16 includes a pair of arcuate side walls 18 where the free edge 20 is adapted to be received within an annular slot 22 about the wall of pipe 12. Along the base wall 24 of one of the channel members 16, access means 26 to the contained sealing gasket 14 may be provided. Preferably, such access means 26 includes an access port 28 through which a valve stem 30, as known in the art, may project. Further, a circular housing 32, externally threaded to receive a cap 34, may be provided to contain the projecting valve stem 30. Since the gasket 14 will be under pressure, it is preferable to include valve stop 36, secured to stem 30, within circular housing 32.

The preferred coupling system of this invention, by virtue of its construction, is intended to be used for a known pipe diameter. That is, the arcuate shape of the channel members 16 must be consistent with or dimensioned to the pipe so that a proper seating or engagement of the channel members 16 to the pipe will be achieved. With such condition established, a pair of the channel members 16 are brought into engagement with a pair of aligned pipes, as illustrated in FIG. 1. In this embodiment, each end of one of the channel members 16 is provided with a hinged threaded member 40 comprising flange members 42 within which threaded member 44 may pivot. Each end of the other channel member 16 may include a C-shaped flange 46 into which threaded member 44 may seat upon pivoting. In addition, to provide for some relative movement between the respective channel members 16, the channel width of one such member may be slightly enlarged 48 to receive the other channel member in sliding engagement therewith. Finally, to bring the channel members 16 into a tight engagement with the contained pipes 12, threaded member 44 is pivoted into C-shaped flange 46 where bolt member 50 is applied thereto. Tightening of the respective bolt members 50, as shown by the direction arrows, will cause the channel members 16 to be brought closer together into tight, gripping engagement with the pipes 12.

The coupling system of this invention is designed for new construction as well as for the repair of existing pipe systems. For new construction, the gasket 14 may be a continuous, elastomeric sealing member. However, for repair of existing pipe systems, a continuous sealing member is not practical. For the latter arrangement, a single discrete sealing member 60, such as illustrated in FIG. 4, may be used. In such a case, the sealing member 60 is provided with a valve stem 62 at a central position, with the ends 64 thereof provided with a fastening means, such as cooperating "Velcro" strips, as known in the art. By this arrangement, the sealing member can encircle the aligned pipes at the joint thereof and be secured thereabout. Thereafter the encircling channel members may be placed over the sealing member 60.

Figure 6:
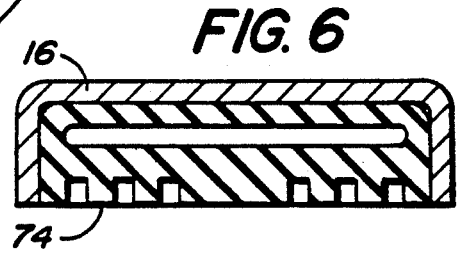
FIG. 6 is a sectional view illustrating a preferred embodiment for the profile of the contact surface of an elastomeric gasket sealing member.
Figure 7:
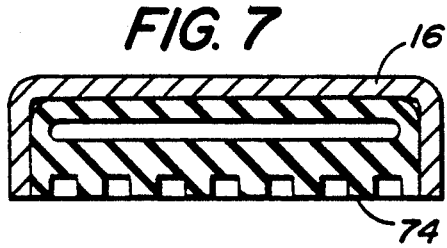
FIG. 7 is a sectional view similar to FIG. 6 showing an alternative profile for a sealing member.
Figure 6A:
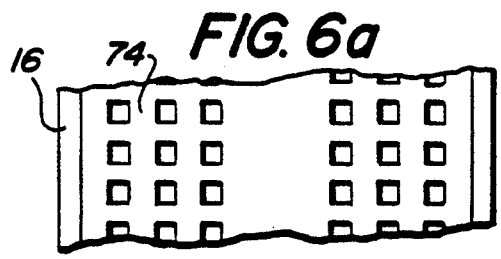
FIG. 6a is a bottom view of the sealing member of FIG. 6.
Figure 7A:
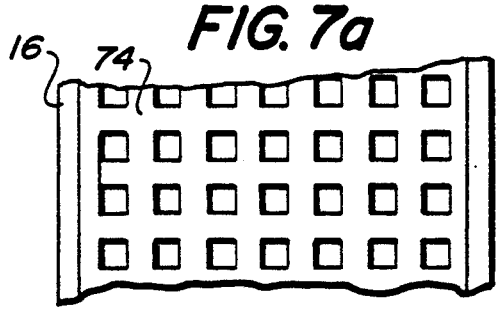
FIG. 7a is a bottom view of the sealing member of FIG. 7.
Figure 18:
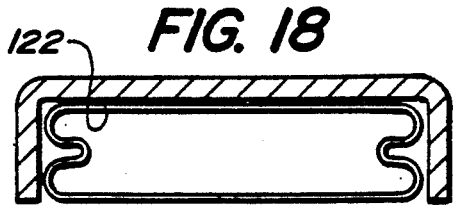
Figure 20:
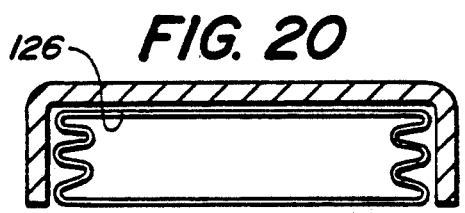
Figure 19:

To localize or concentrate the pressure from the inflated gasket 14 against the aligned pipes, the contact or inside surface 65 of the gasket 14, 60 may be provided with annular ribs 66 or waffle configured, see FIGS. 5, 6, 6a, 7 and 7a. Specifically, FIG. 5 illustrates a sealing member having a broad, continuous portion 67 or rib between plural narrow ribs 66; FIGS. 6 and 6a show a semi-waffle contact surface; and, FIG. 7 and 7a illustrate a waffle configuration throughout the contact surface. In the case of repairs, where rusted or sharp edges or projections may be found at the joint area, a thin, flexible, protective plastic strip 68 may be disposed between the pipe and the gasket 14,60, see FIG. 5 by way of example.

One of the features of this invention is the provision of a means to allow the encircling channel-shaped member to engage the end walls of the underlying pipes adjacent the joint therebetween. For metal pipe, such as steel, as shown in section in FIG. 2, a pair of annular slots 22 about the respective pipes are provided. Plastic pipe, on the other hand, is softer and of lower strength than metal pipe. While an annular slot could be used, particularly with thick-walled pipe, a preferred manner of engaging plastic pipe is illustrated in FIGS. 8-10. Additionally, the type of joint or repair to be made can dictate the preferred sealing member contact configuration. For example, in smooth-walled, clean pipe. i.e. new construction, a ribbed arrangement is preferred for normal to high pressure applications (FIG. 5). In repair applications, where the pipe joint may exhibit rough edges, rust, or other surface irregularities, a semiwaffle or a waffle arrangement (FIGS. 6 and 7) are preferred, with the individual projections 74, sealing against the pipe end wall.

As an alternative for lower pressure applications with plastic pipe, the inner channel member 82, along with the inflatable bladder 89, may be removed. However, suitable pressure applying gripping means, such as the hinged threaded member 40, must be used to insure that pressure is applied against the continuous solid gasket 88 about the pipe sections. This will cause the serrations to dig into the plastic pipe and secure the coupling in position.

FIGS. 8-10 represent an alternative approach in providing an effective seal which incorporates a thrust restraint mechanism for a high pressure plastic transmission line. Within the encircling channel-shaped member 80, a second pair of channel-shaped members 82 having slidable engaging ends is provided. The height thereof is less so that lower and upper chambers 84,86, respectively, are found. Within the upper chamber 86 a continuous inflatable bladder 89 is placed, to be hydraulically or pneumatically inflated in the manner described above. The lower chamber 84 is provided with a continuous solid gasket 88, preferably including plural annular ribs 90 along the bottom surface thereof, lying adjacent to a broad center rib 90'. In operation, as the sealing member 89 is hydraulically or pneumatically inflated, pressure against the second channel-shaped member 82 drives the serrated edges 92 thereof into the plastic pipe, thereby preventing the pipes from separating under axial loading. Concurrent with this action, the solid gasket 88 is further compressed against the pipe joint to effectively seal same.

FIGS. 11 to 13 illustrate an external coupling or sealing system which has particular utility for repair situations, where the damage may be at a midpoint, for example, in the form of thin cracks or slits extending over several inches. For this system, a discrete bladder is wrapped around the pipe in an overlapping relationship 100. Thereafter, a broad channel-shaped member 102 is placed thereabout, and the bladder inflated in a manner described above.

FIGS. 14 to 16 are directed to an alternate arrangement for the encircling housing member 104. In this embodiment, the pair of channel-shaped members 106, forming the housing 104, are hinged 108, as in clam shell fashion, then drawn together by fastening arrangement 110, as described above. To protect the inflatable sealing member to be disposed there within, a thin, U-shaped metal insert 112, spot welded to one channel member 106, may be included to cover the gap between the respective channel members 106. Alternatively, the insert 112 may be seated within a machined recess 114 to provide a continuous inner wall for the channel members 106.

While the preferred embodiment of this invention is directed to the use of a hydraulically/pneumatically inflatable, elastomeric gasket, there are situations where an inflatable, thin metal chamber may be used to replace the elastomeric gasket. FIGS. 17 to 20 illustrate the simple rectangular chamber 120 (FIG. 17) to several different profiles 122, 124, 126 (FIGS. 18 to 20) for the thin metal chamber. The rectangular chamber 120, as illustrated in FIG. 17 has been modified by the inclusion of a heat resistant liner 128 intermediate the chamber 120 and the outside wall of the underlying tubular member.

We claim:

1. An externally applied mechanical system for controlling leakage from and between tubular members, comprising an inflatable, elastomeric sealing gasket adapted to encircle and apply pressure to the wall of said tubular members, where said sealing gasket includes means for inflating same with a pressurized medium, and a support member in engagement with the wall of said tubular members and arranged to overlie said sealing gasket so as to confine the compressive pressure from said sealing gasket against a predefined annular portion of said tubular member, where said support member includes means for tightening same about said tubular members.

2. The externally applied mechanical system according to claim 1 wherein said support member comprises at least two arcuate shaped channel members whole ends interconnect to provide continuous support about said tubular member.

3. The externally applied mechanical system according to claim 2 wherein said arcuate shaped channel members include a base and a pair of opposed side walls projecting therefrom, where the edge of said side walls remote from said base engage said tubular member, where said means for tightening said support member is secured to said channel members to move one such channel member closer to a second such channel member, whereby to tighten the grip of said channel members about said tubular member.

4. The externally applied mechanical system according to claim 3 wherein said tubular member is provided with a groove or recess to receive said edge of one of said walls.

5. The externally applied mechanical system according to claim 3 wherein said edge is provided with plural serrations to engage the outer wall of said tubular member.

6. The externally applied mechanical system according to claim 2 wherein said sealing gasket is provided with a plurality of ribs which lie adjacent said tubular member, which when said sealing gasket is inflated will be compressed against the outer wall of said tubular member.

7. The externally applied (coupling) mechanical system according to claim 6 wherein said ribs are arranged in two parallel sets, and that a separate thin, continuous sheetlike member is included between said sets.

8. The externally applied mechanical system according to claim 2 including a continuous, solid elastomeric sealing member lying adjacent to said tubular member, and further including a U-shaped plate member disposed within said channel members between said solid elastomeric sealing member and said sealing gasket.

9. The externally applied mechanical system according to claim 8, where said tubular member is plastic, and wherein the edge of opposed side walls of said U-shaped plate member are serrated for engagement with said plastic tubular member.

10. The externally applied mechanical system according to claim 8 wherein said sealing member is provided with plural ribs for compressing under pressure against said tubular member.

11. The externally applied mechanical system according to claim 1 wherein said sealing gasket is a continuous tube-like member lying adjacent said tubular member.

12. The externally applied mechanical system according to claim 1 wherein said sealing gasket is a discrete tube-like member of a length sufficient to encircle said tubular member, including means at the ends thereof for securing same in overlapping relationship.

13. The externally applied mechanical system according to claim 1 wherein the portion of said gasket compressed against said predefined annular portion of said tubular member includes a wide central, continuous rib disposed between a plurality of discrete raised projections arranged in a waffle-like pattern.

14. The externally applied mechanical system according to claim 1 wherein at least the outer portions of said gasket compressed against said predefined annular portion of said tubular member are configured in a waffle-like pattern.

15. An externally applied mechanical system for a plastic tubular member, comprising a circular, elastomeric gasket adapted to encircle and compressably engage and apply pressure to the wall of said plastic tubular member, and a channel-shaped support member arranged to overlie said gasket to transmit compressive pressure applied thereby through said gasket against a predefined annular portion of said plastic tubular member, where said support member includes a pair of walls in contact with said plastic tubular member, means for tightening said support member about Said tubular member, and that said contact portion includes plural serrations to dig into the wall of said plastic tubular member by the action of said tightening means.

* * * * *